US012603416B2

(12) United States Patent
Yin et al.

(10) Patent No.: US 12,603,416 B2
(45) Date of Patent: Apr. 14, 2026

(54) MOUNTING ASSEMBLY FOR AN INTEGRATED BASE STATION ANTENNA AND AN INTEGRATED BASE STATION ANTENNA

(71) Applicant: Outdoor Wireless Networks LLC, Claremont, NC (US)

(72) Inventors: MeiHua Yin, Suzhou (CN); PuLiang Tang, Suzhou (CN); Nengbin Liu, Suzhou (CN); Xun Zhang, Suzhou (CN); Xiaohua Tian, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 62 days.

(21) Appl. No.: 18/710,339

(22) PCT Filed: Oct. 18, 2022

(86) PCT No.: PCT/US2022/078261
§ 371 (c)(1),
(2) Date: May 15, 2024

(87) PCT Pub. No.: WO2023/091831
PCT Pub. Date: May 25, 2023

(65) Prior Publication Data

US 2025/0007149 A1 Jan. 2, 2025

(30) Foreign Application Priority Data

Nov. 19, 2021 (CN) ......................... 202111373079.9

(51) Int. Cl.
*H01Q 1/24* (2006.01)
*H01Q 19/10* (2006.01)

(52) U.S. Cl.
CPC ........... *H01Q 1/246* (2013.01); *H01Q 19/104* (2013.01)

(58) Field of Classification Search
CPC ........ H01Q 1/246; H01Q 1/228; H01Q 15/14; H01Q 19/104; H01Q 19/10; H01Q 21/28
See application file for complete search history.

(56) References Cited

U.S. PATENT DOCUMENTS 9,692,115 B2 * 6/2017 Rucki .................... H01Q 1/246
10,122,077 B2 * 11/2018 Fröhler .................. H01Q 1/246
(Continued)

FOREIGN PATENT DOCUMENTS

CN 102509896 A * 6/2012 ............... H01Q 1/42
CN 211700530 U * 10/2020

OTHER PUBLICATIONS

Internatioanl Search Report and Written Opinion corresponding to PCT/US2022/078261; dated Feb. 7, 2023, (9 pages).
(Continued)

*Primary Examiner* — Bayan Salone
(74) *Attorney, Agent, or Firm* — Myers Bigel, P.A.

(57) ABSTRACT

The present disclosure relates to a mounting assembly for an integrated base station antenna and an integrated base station antenna. The integrated base station antenna comprises a 4G antenna module and a 5G antenna module. The mounting assembly comprises at least one mounting frame and two rails located at both sides of the mounting frame, wherein the 5G antenna module of the integrated base station antenna is mounted in the space formed by the mounting frame and the two rails, the mounting frame and the two rails are all made of metal, the two rails are formed to be in mechanical contact with or electrically coupled with a metal component of the 5G antenna module and/or in mechanical contact with or electrically coupled with the mounting frame to form a reflection cavity for reflecting radio frequency signals, and the reflecting cavity is capable of reflecting radio frequency signals transmitted backward by the 4G antenna module of
(Continued)

the integrated base station antenna in order to at least reduce the loss of the radio frequency signals transmitted by the 4G antenna module.

20 Claims, 6 Drawing Sheets

(56) References Cited

U.S. PATENT DOCUMENTS

| | | | | |
|---|---|---|---|---|
| 11,749,881 | B2 * | 9/2023 | Hou | H04B 7/0617 343/835 |
| 2016/0240916 | A1 | 8/2016 | Rucki et al. | |
| 2017/0040679 | A1 | 2/2017 | Fröhler et al. | |
| 2021/0305684 | A1 * | 9/2021 | Hou | H01Q 15/0013 |

OTHER PUBLICATIONS

Internatioanl Preliminary Report on Patentability corresponding to PCT/US2022/078261, May 30, 2024, (6 pages).

* cited by examiner

MOUNTING ASSEMBLY FOR AN INTEGRATED BASE STATION ANTENNA AND AN INTEGRATED BASE STATION ANTENNA

RELATED APPLICATION

The present application is a 35 U.S.C. § 371 national phase application of International Application Serial No. PCT/US2022/078261, filed Oct. 18, 2022, which claims priority from and the benefit of Chinese Patent Application No. 202111373079.9, filed Nov. 19, 2021, the disclosures of which are hereby incorporated herein by reference in full.

TECHNICAL FIELD

The present disclosure relates to the field of wireless communication technology in general. More specifically, the present disclosure relates to a mounting assembly for an integrated base station antenna and an integrated base station antenna comprising the mounting assembly.

BACKGROUND ART

With the development of radio communication technology, an integrated base station antenna integrated with a 4G antenna module and a 5G antenna module is more widely used. In this integrated base station antenna, the 4G antenna module and the 5G antenna module may be individually formed and then successively mounted on a pole to form an integrated base station antenna.

However, current integrated base station antennas have some flaws. For example, in an integrated base station antenna, a 5G antenna module 1 is usually mounted on the back of a 4G antenna module 2. In order for the radio frequency signals transmitted by the 5G antenna module 1 to be able to radiate forward, a reflecting plate 3 mounted in the 4G antenna module 2 usually has an opening 4 at the mounting location corresponding to the 5G antenna module 1 for the radio frequency signals transmitted by the 5G antenna module 1 to pass through. However, the presence of the opening 4 may cause some of the radio frequency signals transmitted by the 4G antenna module 2 to radiate backward from a side gap 5 between the 4G antenna module 2 and the 5G antenna module 1 (as shown by the arrow in FIG. 1) rather than being reflected forward by the reflecting plate 3, which results in loss of radio frequency signals transmitted by the 4G antenna module 2; such loss is unexpected.

Furthermore, when a current integrated base station antenna is mounted, the 4G antenna module 2 is usually first mounted on the pole. Subsequently, the 5G antenna module 1 is vertically lifted by lifting equipment, and a hook 6 set on the top of the 5G antenna module (as shown in FIG. 2) is used to hook the 5G antenna module 1 from one side of the 4G antenna module 2 on to a corresponding support component of the 4G antenna module. During this process, because the corresponding support component of the 4G antenna module is capable of matching the hook 6 and supporting the weight of the 5G antenna module, installers are able to easily push the 5G antenna module from one side of the 4G antenna module to the other side so that the 5G antenna module 1 is aligned with the 4G antenna module 2, and the 5G antenna module is fixed. This mounting method is advantageous for a vertically mounted 4G antenna module 2 (as shown in FIG. 3*a*). However, in reality, the 4G antenna module 2 is usually mounted at a certain angle of inclination, rather than mounted vertically (as shown in FIG. 3*b*). Under such circumstance, it is difficult to use the hook 6 of a 5G antenna module vertically lifted by lifting equipment to hook it on to the corresponding support component on a 4G antenna module, and it is also difficult to push it from one side of the 4G antenna module to the other side after it is hooked on to the corresponding support component of the 4G antenna module.

Thus, it is necessary to improve current integrated base station antennas.

SUMMARY OF THE INVENTION

One of the objectives of the present disclosure is to overcome at least one shortcoming in the prior art.

According to the first aspect of the present disclosure, a mounting assembly for an integrated base station antenna is provided. The integrated base station antenna may comprise a 4G antenna module and a 5G antenna module. The mounting assembly may comprise at least one mounting frame and two rails located at both sides of the mounting frame, wherein the 5G antenna module of the integrated base station antenna is mounted in the space formed by the mounting frame and the two rails, the mounting frame and the two rails are all made of metal, the two rails are formed to be in mechanical contact with or electrically coupled with a metal component of the 5G antenna module and/or in mechanical contact with or electrically coupled with the mounting frame to form a reflection cavity for reflecting radio frequency signals, and the reflecting cavity is capable of reflecting radio frequency signals transmitted backward by the 4G antenna module of the integrated base station antenna in order to at least reduce the loss of the radio frequency signals transmitted by the 4G antenna module.

In an embodiment according to the present disclosure, the mounting assembly may comprise a plurality of mounting frames that are separated from each other.

In an embodiment according to the present disclosure, the mounting bracket may comprise a first bracket section generally extending along a longitudinal direction and two second bracket sections generally extending along a side direction; wherein the first bracket section is formed and fixed on the back of the 5G antenna module while the two second bracket sections are formed at both sides of the 5G antenna module.

In an embodiment according to the present disclosure, each second bracket section is mechanically connected to or electrically coupled with a corresponding rail so that the mounting bracket and the rail form at least a portion of the reflecting cavity.

In an embodiment according to the present disclosure, the rail is formed as a hollow structure extending along a vertical direction.

In an embodiment according to the present disclosure, the rail may comprise a first surface extending along a longitudinal direction and a second surface extending along a side direction; wherein the first surface is formed to abut the back of the 4G antenna module in a manner of at least partially overlapping a reflecting plate of the 4G antenna module in position and to be electrically coupled with the reflecting plate of the 4G antenna module while the second surface faces a side of the 5G antenna module and is capable of being electrically coupled with the metal component of the 5G antenna module.

In an embodiment according to the present disclosure, the reflecting cavity may be formed by the reflecting plate of the 4G antenna module, the first surface and the second surface of the rail, and the metal component of the 5G antenna module.

In an embodiment according to the present disclosure, the mounting assembly may further comprise an intermediate coupling element; wherein the intermediate coupling element is made of metal and is formed to be in mechanical contact with or electrically coupled with the rails and the metal component of the 5G antenna module respectively.

In an embodiment according to the present disclosure, the intermediate coupling element may comprise a first coupling section and a second coupling section connected by a transition section, wherein the first coupling section is formed to be in mechanical contact with or electrically coupled with the rail, and the second coupling section is formed to be in mechanical contact with or electrically coupled with the metal component of the 5G antenna module.

In an embodiment according to the present disclosure, the mounting frame and the rails are formed as individual components.

In an embodiment according to the present disclosure, the mounting frame and the rails are formed as a unity piece.

In an embodiment according to the present disclosure, the metal component of the 5G antenna module may comprise at least one of the reflecting plate of the 5G antenna module and an metal enclosure.

In an embodiment according to the present disclosure, the mounting assembly may comprise a supported element set at the bottom of the mounting assembly between two rails, and the mounting assembly further comprises a support element set at an appropriate location of the back of the 4G antenna module; wherein the support element is formed to support the 5G antenna module vertically from the bottom by supporting the supported element.

In an embodiment according to the present disclosure, the supported element may comprise a supported section of generally an "L" shape, and the supported section comprises a first section extending generally along a vertical direction and a second section extending generally along a side direction.

In an embodiment according to the present disclosure, a second section of the supported element and a first section of the supported element may form a first angle less than 90°.

In an embodiment according to the present disclosure, the first angle may be less than or equal to 60°.

In an embodiment according to the present disclosure, the support element may comprise a support section of generally an "L" shape, and the support section comprises a first section extending generally along a vertical direction and a second section extending generally along a side direction.

In an embodiment according to the present disclosure, a second section of the support element and a first section of the support element may form a second angle less than 90°.

In an embodiment according to the present disclosure, the second angle may be less than or equal to 80°.

In an embodiment according to the present disclosure, the first angle of the supported element may be less than the second angle of the support element.

In an embodiment according to the present disclosure, the supported element may further comprise a third section extending from the top of the first section of the supported element along the direction opposite to the second section of the supported element, and the supported element is fixed on the two rails via the third section.

In an embodiment according to the present disclosure, the support element may further comprise a third section extending from the top of the first section of the support element along the direction opposite to the second section of the support element, and the supported element is fixed on the back of the 4G antenna module.

In an embodiment according to the present disclosure, the mounting assembly may comprise a longitudinal fastener set at the top of the mounting assembly between the two rails, and the longitudinal fastener comprises at least one hole, through which the fastener extends.

In an embodiment according to the present disclosure, the hole is directed so that the fastener extends forward from the back of the 5G antenna module along a side direction through the hole and as a result the 5G antenna module is fixed on the 4G antenna module.

In an embodiment according to the present disclosure, the hole is directed so that the fastener extends downward from the top of the 5G antenna module along a vertical direction through the hole and as a result the 5G antenna module is fixed on the 4G antenna module.

In an embodiment according to the present disclosure, the longitudinal fastener may comprise a plurality of holes; wherein some of the plurality of holes are directed so that the fastener extends forward from the back of the 5G antenna module along a side direction through the hole and as a result the 5G antenna module is fixed on the 4G antenna module, while some others of the plurality of holes are directed so that the fastener extends downward from the top of the 5G antenna module along a vertical direction through the hole and as a result the 5G antenna module is fixed on the 4G antenna module.

According to the second aspect of the present disclosure, a mounting assembly for an integrated base station antenna is provided. The integrated base station antenna may comprise a 4G antenna module and a 5G antenna module. The mounting assembly may comprise: at least one mounting frame and two rails located at both sides of the mounting frame, the 5G antenna module of the integrated base station antenna being mounted in the space formed by the mounting frame and the two rails, a supported element set at the bottom of the mounting assembly between two rails, and a support element set at an appropriate location of the back of the 4G antenna module, wherein the support element is formed to support the 5G antenna module vertically from the bottom by supporting the supported element.

In an embodiment according to the present disclosure, the two rails may be made of metal and may be in mechanical contact with or electrically coupled with a metal component of the 5G antenna module to form a reflection cavity for reflecting radio frequency signals, and the reflecting cavity is capable of reflecting radio frequency signals transmitted backward by the 4G antenna module of the integrated base station antenna in order to at least reduce the loss of the radio frequency signals transmitted by the 4G antenna module.

In an embodiment according to the present disclosure, the supported element may comprise a supported section formed by a first section and a second section forming a first angle, and the support element may comprise a support section formed by the first section and the second section forming a second angle, wherein the first angle of the supported element is less than the second angle of the support element.

According to the third aspect of the present disclosure, an integrated base station antenna is provided. The integrated base station antenna includes a 4G antenna module, a 5G antenna module, and a mounting assembly according to the present disclosure.

It should be noted that various aspects of the present disclosure described for one embodiment may be included in other different embodiments, even though specific description is not made for the other different embodiments. In other words, all the embodiments and/or features of any embodiment may be combined in any manner and/or combination, as long as they are not contradictory to each other.

DESCRIPTION OF ATTACHED DRAWINGS

A plurality of aspects of the present disclosure will be better understood after reading the following specific embodiments with reference to the attached drawings. Among the attached drawings.

Figure 3A:
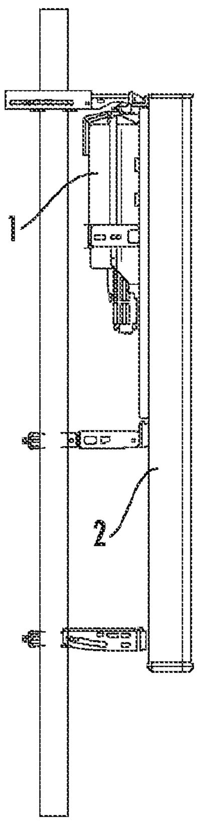
Figure 3B:
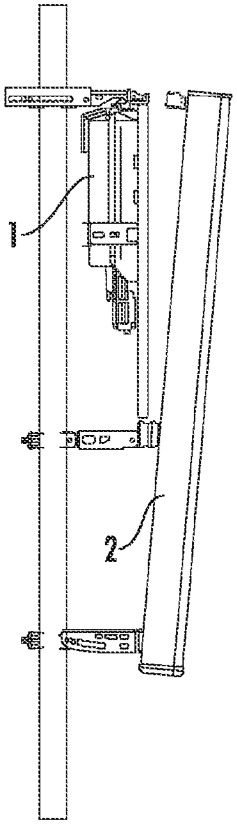
Figure 4:
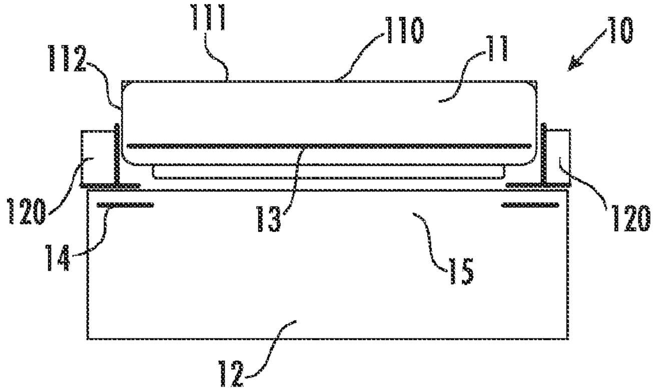
Figure 5:
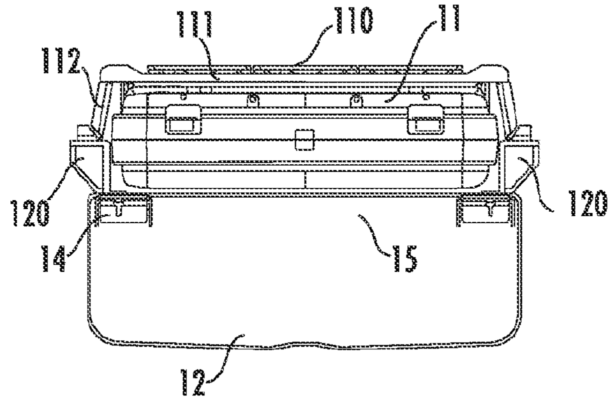
Figure 6:
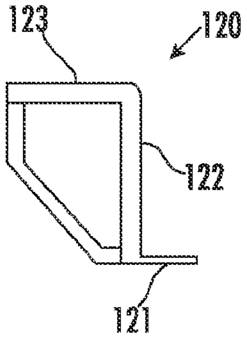
Figure 7:
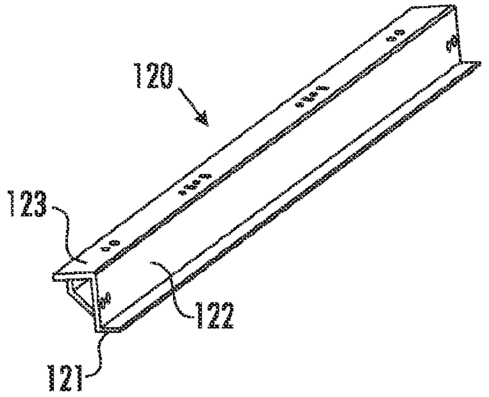
Figure 8:
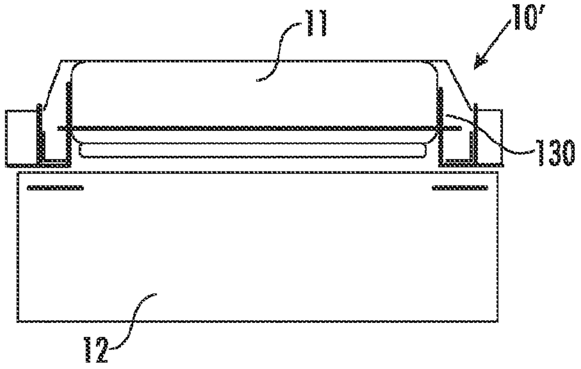
Figure 9:
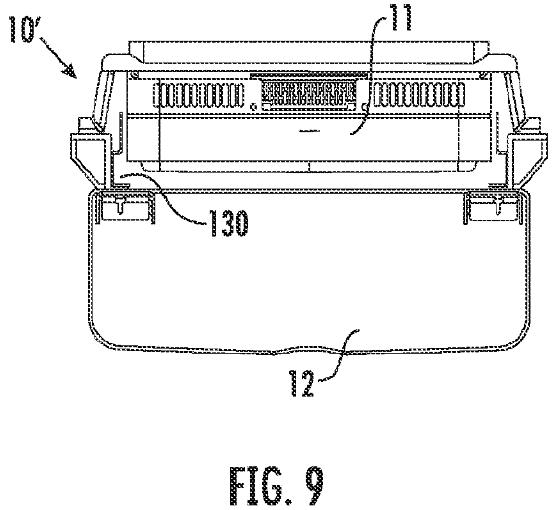
Figure 10:
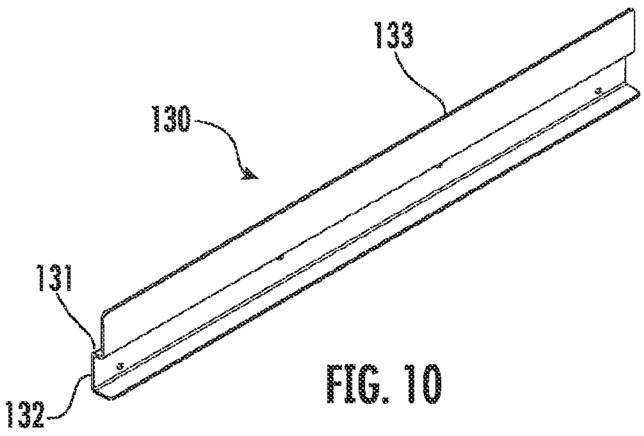
Figure 11:
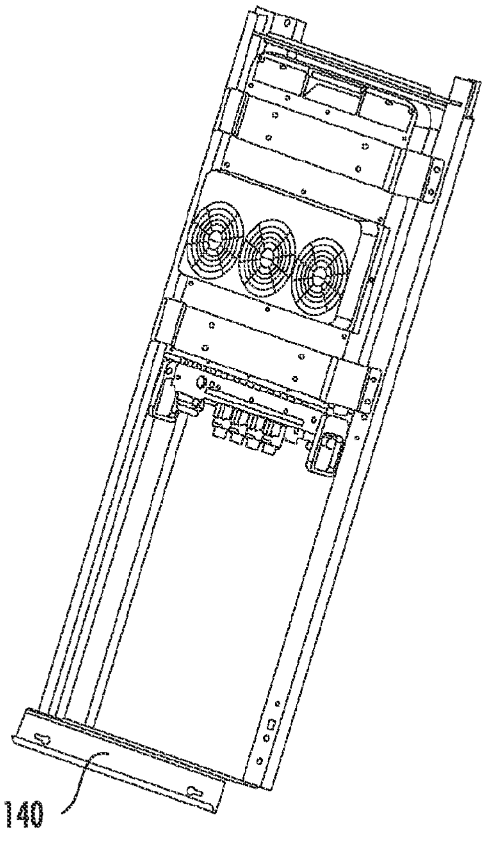
Figure 12:
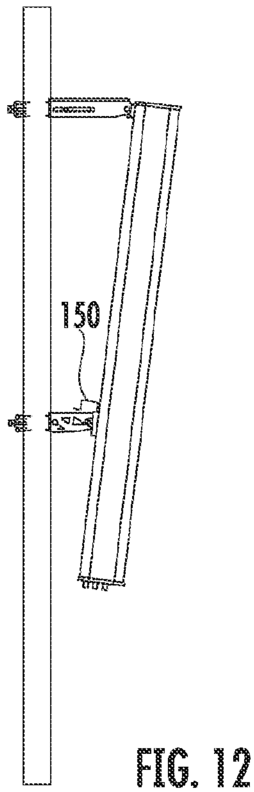
Figure 13:
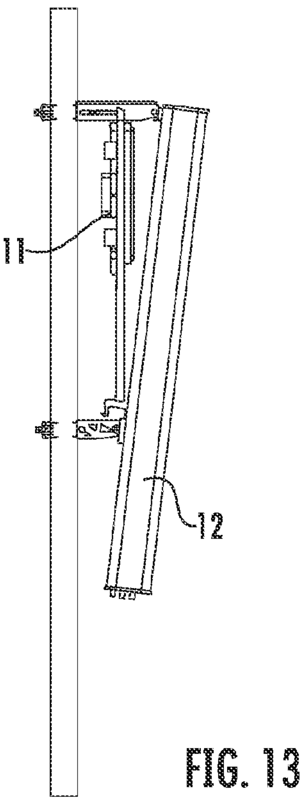
Figure 14:
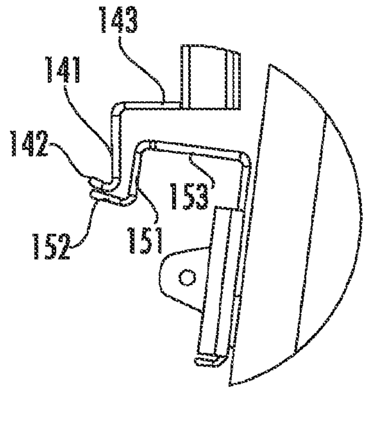
Figure 15:
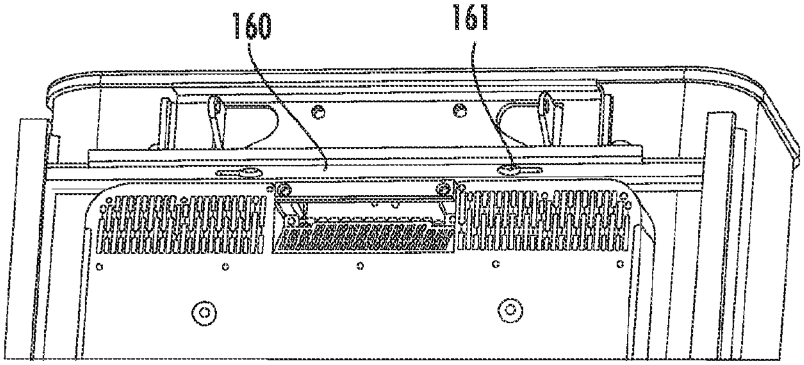
Figure 16:
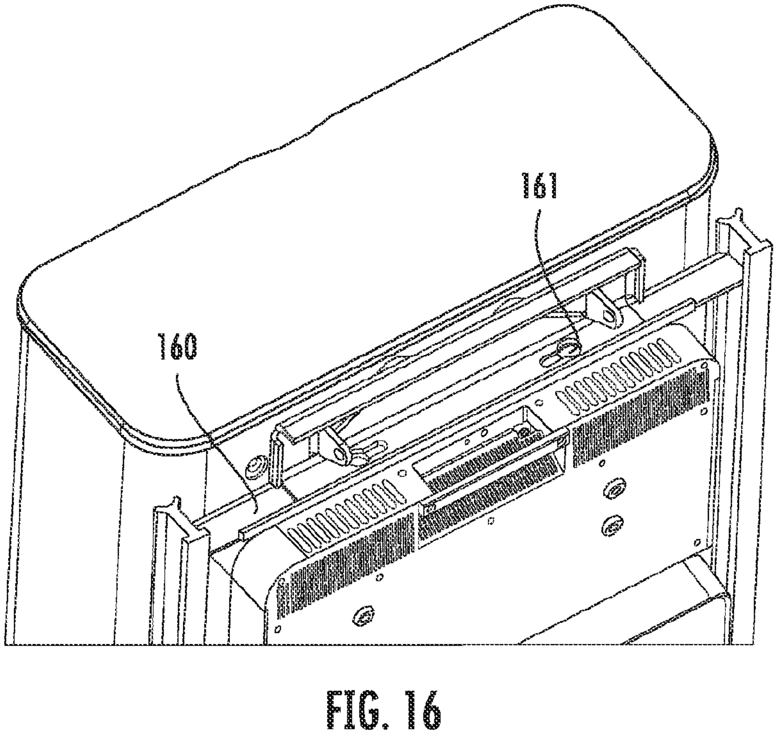

FIG. 3*a* is a schematic illustration of a current integrated base station antenna during the process of being vertically mounted;

FIG. 3*b* is a schematic illustration of a current integrated base station antenna during the process of being mounted in an angle of inclination;

FIG. 4 is a schematic illustration of a mounting assembly according to an embodiment of the present disclosure; the mounting assembly is capable of forming a reflecting cavity to reflect radio frequency signals;

FIG. 5 is a top view of the mounting assembly shown in FIG. 4;

FIG. 6 and FIG. 7 are a top view and a perspective view of the rail of the mounting assembly shown in FIG. 4;

FIG. 8 is a schematic illustration of a mounting assembly according to another embodiment of the present disclosure, which comprises an intermediate coupling element;

FIG. 9 is a top view of the mounting assembly shown in FIG. 8;

FIG. 10 is a perspective view of the intermediate coupling element of the mounting assembly shown in FIG. 8;

FIG. 11 is a schematic illustration of a mounting assembly according to yet another embodiment of the present disclosure, which shows a supported element set at the bottom of the mounting assembly;

FIG. 12 is a schematic illustration of a support element set at the back of a 4G antenna module according to an embodiment of the present disclosure;

FIG. 13 is a schematic illustration showing the match of the supported element shown in FIG. 11 and the support element shown in FIG. 12;

FIG. 14 is a partial enlarged view showing the match of the supported element shown in FIG. 11 and the support element shown in FIG. 12;

FIG. 15 is a schematic illustration of a mounting assembly according to yet another embodiment of the present disclosure; the mounting assembly comprises a longitudinal fastener suitable for fixating the 5G antenna module at the 4G antenna module;

FIG. 16 is a schematic illustration of a mounting assembly according to yet another embodiment of the present disclosure; the mounting assembly comprises a longitudinal fastener suitable for fixating the 5G antenna module at the 4G antenna module.

It should be understood that in all the attached drawings, the same symbols denote the same elements. In the attached drawings, for clarity, the size of certain feature is not drawn to scale as it may change.

SPECIFIC EMBODIMENTS

The present disclosure will be described below with reference to the attached drawings, and the attached drawings illustrate certain embodiments of the present disclosure. However, it should be understood that the present disclosure may be presented in many different ways and is not limited to the embodiments described below; in fact, the embodiments described below are intended to make the content of the present disclosure more complete and to fully explain the protection scope of the present disclosure to those skilled in the art. It should also be understood that the embodiments disclosed in the present disclosure may be combined in various ways so as to provide more additional embodiments.

It should be understood that the words in the Specification are only used to describe specific embodiments and are not intended to limit the present disclosure. Unless otherwise defined, all terms (including technical terms and scientific terms) used in the Specification have the meanings commonly understood by those skilled in the art. For brevity and/or clarity, well-known functions or structures may not be further described in detail.

The singular forms “a”, “an”, “the” and “this” used in the Specification all include plural forms unless clearly indicated. The words “include”, “contain” and “have” used in the Specification indicate the presence of the claimed features, but do not exclude the presence of one or a plurality of other features. The word “and/or” used in the Specification includes any or all combinations of one or a plurality of the related listed items.

In the Specification, when it is described that an element is “on” another element, “attached” to another element, “connected” to another element, “coupled” with another element, or “in contact with” another element, etc., the element may be directly on another element, attached to another element, connected to another element, coupled with another element, or in contact with another element, or an intermediate element may be present.

In the Specification, the terms “first”, “second”, “third”, etc. are only used for convenience of description and are not intended for limitation. Any technical features represented by “first”, “second”, “third”, etc. are interchangeable.

In the Specification, terms expressing spatial relations such as “upper”, “lower”, “front”, “rear”, “top”, and “bottom” may describe the relation between one feature and another feature in the attached drawings. It should be understood that, in addition to the locations shown in the attached drawings, the words expressing spatial relations further include different locations of a device in use or operation. For example, when a device in the attached drawings is turned upside down, the features originally described as being “below” other features now can be described as being “above” the other features”. The device may also be oriented by other means (rotated by 90 degrees or at other locations), and at this time, a relative spatial relation will be explained accordingly.

In the specification, a direction, which is vertical to the horizontal ground and extends along the length direction of a 4G or 5G antenna module, is defined as a “vertical direction”; a direction, which is vertical to the vertical direction and extends along the width direction of the 4G or 5G antenna module, is defined as a “longitudinal direction”;

a direction, which is vertical to the vertical direction and extends along the thickness direction of the 4G or 5G antenna module, is defined as a "side direction".

The present disclosure relates to a mounting assembly for an integrated base station antenna comprising a 4G antenna module and a 5G antenna module. A mounting assembly according to the present disclosure may be formed as a reflecting cavity to reflect radio frequency signals; thus, the reflection of the radio frequency signals transmitted backward by a 4G antenna module may be reduced, which thus reduces the loss of radio frequency signals transmitted by the 4G antenna module. In an embodiment according to the present disclosure, a mounting assembly may be electrically coupled with a metal component of a 5G antenna module (for example, a metal reflecting plate of the 5G antenna module or other metal components such as a metal enclosure of the 5G antenna module), to form a reflecting cavity to reflect radio frequency signals. In another embodiment according to the present disclosure, a mounting assembly itself may be formed as a reflecting cavity to reflect radio frequency signals.

Figure 1:
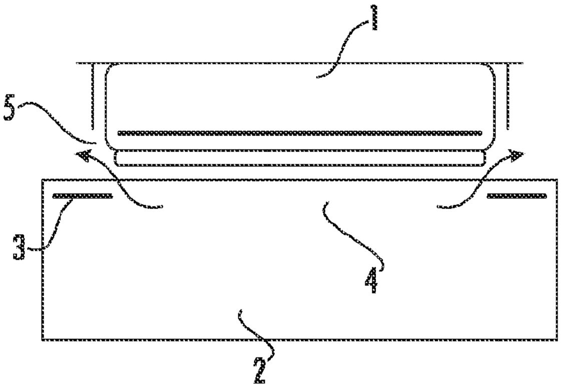
FIG. 1 is a schematic illustration of a current integrated base station antenna, which shows the process of the loss of radio frequency signals transmitted by the 4G antenna module.
Figure 2:
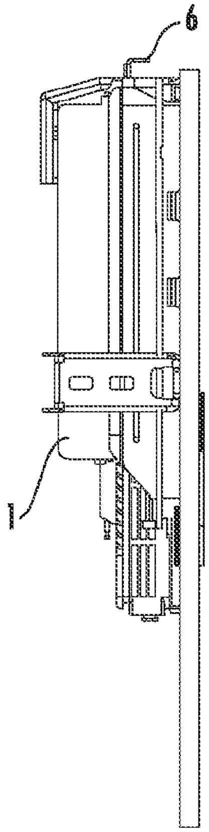
FIG. 2 is a schematic illustration of a 5G antenna module, which shows the hook set at the top of the 5G antenna module.

A mounting assembly 10 according to an embodiment of the present disclosure is shown with reference to FIG. 4 and FIG. 5. In the embodiment shown in FIG. 4 and FIG. 5, the mounting assembly 10 may comprise at least one mounting frame 110 and two rails 120 located at both sides of the mounting frame 110. A 5G antenna module 11 of an integrated base station antenna may be mounted in the space formed by the mounting frame 110 and the two rails 120. The mounting frame 110 and the rails 120 are all made of metal so that the mounting frame 110 and the rails 120 are capable of reflecting radio frequency signals. In an embodiment, the rail 120 may be arranged to be in direct mechanical contact with a metal component of the 5G antenna module 11 (for example, a reflecting plate 13 of the 5G antenna module or other metal components such as a metal enclosure); alternatively, it is close enough to the metal component of the 5G antenna module 11 so that it can be electrically coupled with the metal component of the 5G antenna module 11 so that a reflecting cavity for reflecting radio frequency signals is formed, which can at least reflect the radio frequency signals transmitted backward by the 4G antenna module 12 of the integrated base station antenna. Compared with the current structure shown in FIG. 1, the reflecting cavity formed by the rails 120 of the mounting assembly 10 according to the present disclosure is closed on the side for radio frequency signals (i.e., the side gap 5 shown in FIG. 1 does not exist); thus, radio frequency signals transmitted backward by the 4G antenna module 12 are reflected back in the reflecting cavity, rather than radiating backward from the side gap 5, which thus the loss of radio frequency signals from the 4G antenna module 12 is reduced. In another embodiment, a mounting frame 110 and two rails 120 may be in mechanical contact with or electrically coupled with each other so that the mounting assembly 10 itself is capable of forming a reflecting cavity for reflecting radio frequency signals, which can reflect the radio frequency signals transmitted backward by the 4G antenna module 12 of the integrated base station antenna.

In the embodiment shown in FIG. 4 and FIG. 5, the mounting frame 110 may comprise a first frame section 111 extending generally along a longitudinal direction and two second frame sections 112 extending generally along a side direction. Each second frame section 112 may be perpendicular to the first frame section 111 (as shown in FIG. 4), and may also tilt outward at a certain angle relative to the first frame section 111 (as shown in FIG. 5). The first frame section 111 is formed to be fixed on the back of the 5G antenna module 11, while the two second frame sections 112 are formed at both sides of the 5G antenna module 11 respectively. Each second frame section 112 of the mounting frame 110 may be mechanically connected with (for example, the mechanical connection by means of contact with each other as shown in FIG. 5) or electrically coupled with a corresponding rail 120 so that at least a portion of a reflecting cavity for reflecting radio frequency signals can be formed by the rails 120 and the mounting frame 110, to further reduce the loss of radio frequency signals from the 4G antenna module 12.

FIG. 6 and FIG. 7 are a top view and a perspective view of a rail 120 of a mounting assembly 10 respectively. The rail 120 may be formed as a hollow structure extending along the vertical direction for a certain length. The rail 120 may have a first surface 121 extending along a longitudinal direction and a second surface 122 extending along a side direction. The first surface 121 is formed to abut the back of a 4G antenna module 12 in a manner of at least partially overlapping a reflecting plate 14 of the 4G antenna module 12 in position and to be electrically coupled with the reflecting plate 14 of the 4G antenna module 12. The second surface 122 faces a side of a 5G antenna module 11 and is electrically coupled with a metal component (for example, a reflecting plate 13 of the 5G antenna module 11 or other metal components such as a metal enclosure) of the 5G antenna module 11, provided that they are close enough. Thus, a reflecting cavity for reflecting radio frequency signals may be formed by the reflecting plate 14 of the 4G antenna module 12, the first surface 121 and the second surface 122 of the rail 120 of the mounting assembly 10, the metal component of the 5G antenna module 11, and/or the mounting frame 110 of the mounting assembly 10. In an embodiment according to the present disclosure, a rail 120 may also have a third surface 123 extending along a longitudinal direction. An end of each second frame section 112 of a mounting frame 110 may abut and be fixed on the third surface 123 (as shown in FIG. 5).

In the embodiment shown in FIGS. 4 through 7, the mounting frame 110 of the mounting assembly 10 and the rails 120 are formed as individual components. Such structure allows the 5G antenna module to be easily mounted in the corresponding space of the mounting assembly 10 so that there is more flexibility and versatility for the mounting assembly 10. The length of the rail 120 extending along the vertical direction may be greater than the length of the mounting frame 110 extending along the vertical direction. However, the present disclosure is not limited thereto. In some embodiments according to the present disclosure, a mounting frame 110 of the mounting assembly 10 and rails 120 may be integrated as one unitary piece. For example, the rail 120 may be a part of a second mounting frame section 112 of the mounting frame 110. Furthermore, in some embodiments according to the present disclosure, the mounting assembly 10 may comprise a plurality of mounting frames 110 separated from each other (reference FIG. 11), to adapt to the mounting of the 5G antenna module with a complex back structure.

FIGS. 8 through 10 show a mounting assembly 10' of another embodiment according to the present disclosure. The mounting assembly 10' may have a structure similar to that of the mounting assembly 10; thus, the same components are not described in detail again. In the embodiment shown in FIGS. 8 through 10, a 5G antenna module 11 has a smaller width, which allows for a larger distance between a rail 120 of the mounting assembly 10' and the 5G antenna module 11. Thus, it is difficult for the rail 120 of the mounting assembly 10' to be electrically coupled with a reflecting plate or other metal components of the 5G antenna module 11; thus, it is difficult to form a reflecting cavity closed on the side. To resolve such issue, the mounting assembly 10' is set to have an intermediate coupling element 130. The intermediate coupling element 130 is made of metal and is formed to be in mechanical contact with or electrically coupled with the rails 120 and the metal component (for example, a reflecting plate 13 or other metal components such as a metal enclosure) of the 5G antenna module 11 respectively; thus, a reflecting cavity closed on the side is formed between the rail 120 and the 5G antenna module 11 of the mounting assembly 10'.

With reference to FIG. 9 and FIG. 10, in an embodiment according to the present disclosure, an intermediate coupling element 130 may comprise a first coupling section 132 and a second coupling section 133 connected by a transition section 131. The transition section 131 separates the first coupling section 132 and the second coupling section 133 with a certain distance in a longitudinal direction. The first coupling section 132 of the intermediate coupling element 130 may be in mechanical contact with or electrically coupled with a rail 120 (for example, a second surface 122 of the rail 120 extending along a side direction), and the second coupling section 132 of the intermediate coupling element 130 may be in mechanical contact with or electrically coupled with a metal component of the 5G antenna module 11; thus, a reflecting cavity closed on the side is formed between the rail 120 and the 5G antenna module 11 by means of the first coupling section 132 and the second coupling section 133 of the intermediate coupling element 130.

Furthermore, FIG. 8 and FIG. 9 respectively show two intermediate coupling elements 130 with different structures. However, the present disclosure is not limited to this; an intermediate coupling element 130 may have other different structures. For example, different from the transition section 131 in FIG. 9 and FIG. 10, which is generally perpendicular to the first coupling section 132 and the second coupling section 133, the transition section 131 may be tilted relative to the first coupling section 131 and/or the second coupling section 133, or the section 131 may be formed as a curved section.

With reference to FIGS. 11 through 14, in an embodiment according to the present disclosure, a mounting assembly 10, 10' may comprise a supported element 140 set at the bottom of the mounting assembly between two rails 120 of the mounting assembly. Accordingly, the mounting assembly 10, 10' may further comprise a support element 150 set at an appropriate location of the back of the 4G antenna module 12. When the integrated base station antenna is mounted, the 5G antenna module 11 may be first fixed on the mounting assembly 10, 10' via the mounting frame 110 and then is supported on the support element 150 by the supported element 140 (as shown in FIG. 13 and FIG. 14); thus, the weight of the 5G antenna module 11 is supported by the support element 150, making it easy to mount the 5G antenna module. With the help of the mounting assembly 10', 10' according to the present disclosure, regardless if the 4G antenna module is vertical, tilted forward, or tilted backward, the weight of the 5G antenna module can be supported by the support element 150 at the bottom of the 5G antenna module so that installers can push the 5G antenna module from one side of the 4G antenna module to the other side very effortlessly while the 5G antenna module stays in a vertical state, and thus the 5G antenna module is aligned with the 4G antenna module and the 5G antenna is fixed.

It is more clearly shown in FIG. 11 that in an embodiment according to the present disclosure, a supported element 140 may extend between two rails 120 of the mounting assembly 10, 10' along a longitudinal direction. The supported element 140 may comprise a supported section of generally an "L" shape, and the supported section comprises a first section 141 extending generally along a vertical direction and a second section 142 extending generally along a side direction. In order that the 4G antenna module can be easily supported on the support element 150 by the supported element 140 regardless if the 4G antenna module is vertical, tilted forward, or tilted backward, the second section 142 of the supported element 140 and the first section 141 may form a first angle less than 90° (i.e., an acute angle). In another embodiment according to the present disclosure, a supported element 140 may further comprise a third section 143 extending from the top of a first section 141 along a direction opposite to a second section 142. The supported element 140 may be mounted on two rails 120 of the mounting assembly 10, 10' via the third section 143.

As it is shown more clearly in FIG. 14, in an embodiment according to the present disclosure, a support element 150 may have a structure similar to that of the supported element 140. Specifically, the support element 150 may extend a certain length along a longitudinal direction, for example, the length is generally the same as the length of the supported element 140. The support element 150 may comprise a support section of generally an "L" shape, and the support section comprises a first section 151 extending generally along a vertical direction and a second section 152 extending generally along a side direction. In order that the 4G antenna module can be easily supported on the support element 150 by the supported element 140 regardless if the 4G antenna module is vertical, tilted forward, or tilted backward, the second section 152 of the supported element 150 and the first section 151 may form a second angle less than 90° (i.e., an acute angle). Specifically, the first angle between the second section 142 of the supported element 140 and the first section 141 is less than the second angle between the second section 152 of the supported element 150 and the first section 151. In an embodiment according to the present disclosure, a first angle between a second section 142 of a supported element 140 and a first section 141 may be less than or equal to 60°. In an embodiment according to the present disclosure, a second angle between a second section 152 of a support element 150 and a first section 151 may be less than or equal to 80°. With this structure, the support element 150 can vertically support the supported element 140 and the 5G antenna module very well whether the 4G antenna module is vertical, tilted forward, or tilted backward. Furthermore, similar to the supported element 140, in another embodiment according to the present disclosure, a support element 150 may further comprise a third section 153 extending from the top of a first section 151 along a direction opposite to a second section 152. The support element 150 may be fixed on the back of the 4G antenna module via the third section 153.

Reference FIG. 15 and FIG. 16, in an embodiment of the present disclosure, a mounting assembly 10, 10' may further comprise a longitudinal fastener 160 set on the top of the mounting assembly between two rails of the mounting assembly. The longitudinal fastener 160 may also comprise at least one hole 161 for a fastener (for example, a screw) to extend through. In an embodiment shown in FIG. 15, the hole 161 is directed so that the fastener extends forward from the back of the 5G antenna module along a side direction through the hole 161 and as a result the 5G antenna module is fixed on the 4G antenna module. In an embodiment shown in FIG. 16, the hole 161 is directed so that the fastener extends downward from the top of the 5G antenna module along a vertical direction through the hole 161 and as a result the 5G antenna module is fixed on the 4G antenna module. In another embodiment according to the present disclosure, the longitudinal fastener 160 may comprise a plurality of holes 161; some of the holes 161 are directed so that the fastener extends forward from the back of the 5G antenna module along a side direction through the hole 161 and as a result the 5G antenna module is fixed on the 4G antenna module, while some other holes 161 are directed so that the fastener extends downward from the top of the 5G antenna module along a vertical direction through the hole 161 and as a result the 5G antenna module is fixed on the 4G antenna module. With this structure, installers can flexibly fix the 5G antenna module according to actual circumstances.

Exemplary embodiments according to the present disclosure have been described above with reference to the attached drawings. However, those of ordinary skill in the art should understand that various changes and modifications can be made to the exemplary embodiments of the present disclosure without departing from the gist and scope of the present disclosure. All changes and modifications are included in the protection scope of the present disclosure defined by the claims. The present disclosure is defined by the attached claims, and equivalents of these claims are also included.

The invention claimed is:

1. A mounting assembly for an integrated base station antenna, the integrated base station antenna comprising a 4G antenna module and a 5G antenna module, the mounting assembly comprising at least one mounting frame and two rails located at both sides of the mounting frame;

wherein the 5G antenna module of the integrated base station antenna is mounted in the a space formed by the mounting frame and the two rails; and wherein the mounting frame and the two rails are all made of metal, and the two rails are formed to be in mechanical contact with or electrically coupled with a metal component of the 5G antenna module and/or in mechanical contact with or electrically coupled with the mounting frame to form a reflection cavity for reflecting radio frequency signals; the reflecting cavity is capable of reflecting radio frequency signals transmitted backward by the 4G antenna module of the integrated base station antenna in order to at least reduce the loss of the radio frequency signals transmitted by the 4G antenna module.

2. The mounting assembly according to claim 1, wherein the mounting assembly comprises a plurality of mounting frames that are separated from each other.

3. The mounting assembly according to claim 1, wherein the mounting frame comprises a first frame section extending generally along a longitudinal direction and two second frame sections extending generally along a side direction; wherein the first frame section is formed to be fixed on a back of the 5G antenna module while the two second frame sections are formed at both sides of the 5G antenna module respectively.

4. The mounting assembly according to claim 3, wherein each second frame section is mechanically connected to or electrically with a corresponding rail so that the mounting frame and the rail form at least a portion of the reflecting cavity.

5. The mounting assembly according to claim 1, wherein the rails form a hollow structure extending along a vertical direction.

6. The mounting assembly according to claim 5, wherein each of the rails comprises a first surface extending along a longitudinal direction and a second surface extending along a side direction; wherein the first surface is formed to abut the back of the 4G antenna module in a manner of at least partially overlapping a reflecting plate of the 4G antenna module in position and to be electrically coupled with the reflecting plate of the 4G antenna module while the second surface faces a side of the 5G antenna module and is capable of being electrically coupled with the metal component of the 5G antenna module.

7. The mounting assembly according to claim 1, wherein the mounting assembly further comprises an intermediate coupling element; wherein the intermediate coupling element is made of metal and is formed to be in mechanical contact with or electrically coupled with the rails and the metal component of the 5G antenna module respectively.

8. The mounting assembly according to claim 7, wherein the intermediate coupling element comprises a first coupling section and a second coupling section connected by a transition section; wherein the first coupling section is formed to be in mechanical contact with or electrically coupled with the rails while the second coupling section is formed to be in mechanical contact with or electrically coupled with the metal component of the 5G antenna module.

9. The mounting assembly according to claim 1, wherein the mounting frame and the rails are formed as individual components.

10. The mounting assembly according to claim 1, wherein the mounting frame and the rails are formed as a unitary piece.

11. The mounting assembly according to claim 1, wherein the metal component of the 5G antenna module comprises at least one of a reflecting plate and a metal enclosure of the 5G antenna module.

12. The mounting assembly according to claim 1, wherein the mounting assembly comprises a supported element set at a bottom of the mounting assembly between two rails, and the mounting assembly further comprises a support element set at an appropriate location of a back of the 4G antenna module; wherein the support element is formed to support the 5G antenna module vertically from the bottom by supporting the supported element.

13. The mounting assembly according to claim 12, wherein the supported element comprises a supported section of generally an “L” shape, and the supported section comprises a first section extending generally along a vertical direction and a second section extending generally along a side direction.

14. The mounting assembly according to claim 1, wherein the mounting assembly comprises a longitudinal fastener set at a top of the mounting assembly between the two rails, and the longitudinal fastener comprises at least one hole, through which the fastener extends.

15. The mounting assembly according to claim 14, wherein the hole is directed so that the fastener extends forward from a back of the 5G antenna module along a side direction through the hole and as a result the 5G antenna module is fixed on the 4G antenna module.

16. The mounting assembly according to claim 14, wherein the hole is directed so that the fastener extends downward from a top of the 5G antenna module along a vertical direction through the hole and as a result the 5G antenna module is fixed on the 4G antenna module.

17. A mounting assembly for an integrated base station antenna, the integrated base station antenna comprising a 4G antenna module and a 5G antenna module, the mounting assembly comprising:

at least one mounting bracket and two rails located at both sides of the mounting frame, the 5G antenna module of the integrated base station antenna being mounted in the a space formed by the mounting frame and the two rails, a supported element set at the bottom of the mounting assembly between the two rails, and a support element set at an appropriate location of the back of the 4G antenna module, wherein the support element is formed to support the 5G antenna module vertically from the bottom by supporting the supported element.

18. The mounting assembly according to claim 17, wherein the two rails are made of metal and are in mechanical contact with or electrically coupled with a metal component of the 5G antenna module to form a reflection cavity for reflecting radio frequency signals, and the reflecting cavity is capable of reflecting radio frequency signals transmitted backward by the 4G antenna module of the integrated base station antenna in order to at least reduce the loss of the radio frequency signals transmitted by the 4G antenna module.

19. The mounting assembly according to claim 17, wherein the supported element comprises a supported section formed by a first section and a second section forming a first angle, and the support element comprises a support section formed by a first section and a second section forming a second angle; wherein the first angle of the supported element is less than the second angle of the support element.

20. An integrated base station antenna, the integrated base station antenna comprising a 4G antenna module, a 5G antenna module, and the mounting asssembly according to claim 1.

* * * * *